(12) United States Patent
Brychcy et al.

(10) Patent No.: US 7,255,734 B2
(45) Date of Patent: Aug. 14, 2007

(54) PHTHALOCYANINE PIGMENT PREPARATIONS

(75) Inventors: Klaus Brychcy, Frankfurt am Main (DE); Joachim Weber, Frankfurt am Main (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 10/539,034

(22) PCT Filed: Dec. 4, 2003

(86) PCT No.: PCT/EP03/13690

§ 371 (c)(1),
(2), (4) Date: Jun. 11, 2005

(87) PCT Pub. No.: WO2004/052997

PCT Pub. Date: Jun. 24, 2004

(65) Prior Publication Data

US 2006/0137573 A1    Jun. 29, 2006

(30) Foreign Application Priority Data

Dec. 10, 2002   (DE) .............................. 102 57 498

(51) Int. Cl.
*C09B 67/20*   (2006.01)
*C09B 67/22*   (2006.01)
*C09D 11/02*   (2006.01)

(52) U.S. Cl. ................... 106/413; 106/31.78; 106/410; 106/412; 430/105; 430/108.21; 524/88

(58) Field of Classification Search ................ 106/410, 106/411, 412, 413, 31.78; 430/105, 108.21; 524/88
See application file for complete search history.

(56) References Cited

U.S. PATENT DOCUMENTS

| | | |
|---|---|---|
| 4,055,440 A | 10/1977 | Wheeler et al. |
| 4,298,526 A | 11/1981 | Sappok et al. |
| 4,313,766 A | 2/1982 | Barraclough et al. |
| 5,084,068 A | 1/1992 | Moser et al. |
| 5,126,443 A | 6/1992 | Moser et al. |
| 5,271,759 A | 12/1993 | Wooden et al. |
| 5,296,033 A | 3/1994 | Dietz et al. |
| 5,296,034 A | 3/1994 | Dietz et al. |
| 5,455,334 A | 10/1995 | Wald |
| 5,665,871 A | 9/1997 | Pedrazzi |
| 5,882,360 A | 3/1999 | Bauer et al. |

FOREIGN PATENT DOCUMENTS

| | | |
|---|---|---|
| DE | 2720464 | 11/1977 |
| DE | 2739775 | 3/1978 |
| DE | 2851752 | 6/1980 |
| DE | 4214868 | 11/1992 |
| EP | 0020306 | 12/1980 |
| EP | 0574790 | 12/1993 |
| EP | 0638615 | 2/1995 |
| EP | 0761770 | 3/1997 |
| EP | 0780446 | 6/1997 |
| GB | 1569837 | 2/1985 |
| WO | WO 01/14479 | 3/2001 |

OTHER PUBLICATIONS

U.S. Appl. No. 10/539,033, by Brychcy et al., filed Jun. 10, 2005.
PTC International Search Report for PCT/EP 03/13690, Apr. 28, 2004.
English Translation of PCT IPER for PCT/EP03/013690, Sep. 16, 2004.
U.S. Appl. No. 10/591,578, by Weber et al, filed Sep. 1, 2006.

*Primary Examiner*—Anthony J. Green
(74) *Attorney, Agent, or Firm*—Anthony A. Bisulca

(57) ABSTRACT

A copper phthalocyanine pigment preparation contains a copper phthalocyanine pigment and at least one pigment dispersant from the group of copper phthalocyanine sulfonic acids and copper phthalocyanine sulfonic acid salts. The inventive pigment preparation is characterized by a) a maximum dynamic viscosity of 180 mPas and/or a maximum thixotropy of 800 Pa/s, the dynamic viscosity and the thixotropy being determined by a rotary viscometer at a temperature of 23° C. in a pigment dispersion comprising 28 percent by weight of dry copper phthalocyanine pigment preparation, 9 percent by weight of nitrocellulose, 62.3 percent by weight of ethanol, and 0.7 percent by weight of ethyl acetate; and b) a color intensity such that a printing ink consisting of an ethanol/nitrocellulose gravure varnish, containing 75 to 65 percent by weight of ethanol and 9 to 11 percent by weight of nitrocellulose at a ratio of 2 to 7.5, and a maximum amount of dry copper phthalocyanine pigment preparation of 6.6 percent by weight relative to the total weight of the printing ink, reaches the ⅓ standard depth of shade of the corresponding tone.

13 Claims, No Drawings

PHTHALOCYANINE PIGMENT PREPARATIONS

The invention relates to new pigment preparations based on a copper phthalocyanine pigment and to their use for coloring high molecular weight materials.

When pigments are used to produce printing ink systems there are exacting requirements imposed on the performance properties of the pigments, such as ease of dispersion, printing ink fluidity compatible with the application, high transparency, gloss, color strength, and cleanness of hue. A further desire is that the pigments should be useful universally as far as possible for coloring other high molecular weight systems, such as paints or plastics, for example. Here there are further requirements, some of them asked of printing inks too, such as, for example, high fastnesses, such as bleed fastness, fastness to overcoating, solvent fastness, light fastness and weather fastness properties. For both printing inks and paints, usefulness in both water-based and solvent-based systems is desired. In the case of paint systems, there is a requirement not only for pigments of high transparency, especially for metallic coloring, but also for hiding pigments. In the case of paints a desired facility is to be able to prepare paint concentrates (millbases) which are highly pigmented and yet of low viscosity; with the grinding formulations of printing inks, as well, the trend is toward high concentrations of pigmentation.

The synthesis of phthalocyanines has been known for a long time. The phthalocyanines obtained in coarsely crystalline form in the synthesis, and referred to below as crude pigments, cannot be used without comminution to color high molecular weight materials, owing to the inadequate performance properties of the uncomminuted crude pigments.

A variety of methods have been proposed as to how a phthalocyanine pigment can be produced. In principle its production requires the comminution of the coarsely crystalline crude pigments by means for example of acid pasting, acid swelling or dry or wet grinding. The products obtained, referred to below as prepigments, are generally of poor crystal quality, in the form of agglomerates which do not as yet display the desired performance properties. In order to achieve optimum application properties an aftertreatment, generally termed a finish, is carried out, in solvents for example and with the addition of surface-active agents. In this context there are also proposals, with the aim of improving the performance properties, to produce pigment preparations by using phthalocyanines substituted by sulfonic acid groups.

DE 27 20 464 discloses a method in which a phthalocyanine pigment is subjected to a solvent treatment in the presence of a phthalocyanine-sulfonic salt.

EP 761 770 discloses a method of producing phthalocyanine pigments which adds the phthalocyaninesulfonic salt after the finish in aqueous suspension.

The pigments produced by these methods do not always meet all of the requirements described above. In particular there was a need for highly pigmented copper phthalocyanine printing inks combining low viscosity with high transparency, high color strength, and high gloss.

The invention provides copper phthalocyanine pigment preparations comprising a copper phthalocyanine pigment and at least one pigment dispersant from the group of copper phthalocyaninesulfonic acids and copper phthalocyaninesulfonic salts, characterized by a) a dynamic viscosity of not more than 180 mPas, preferably not more than 165 mPas, in particular not more than 150 mPas, and/or by a thixotropy of not more than 800 Pa/s, preferably not more than 600 Pa/s, in particular not more than 450 Pa/s, the dynamic viscosity and the thixotropy being determined with a rotational viscometer at a temperature of 23° C. in a pigment dispersion consisting of 28% by weight of the copper phthalocyanine pigment preparation (dry), 9% by weight of nitrocellulose (according to ISO 14 446, standard 27A), 62.3% by weight of ethanol and 0.7% by weight of ethyl acetate, and characterized by b) a color strength such that a printing ink consisting of an ethanol/ nitrocellulose gravure varnish (containing 75% to 85% by weight of ethanol and 9% to 11% by weight of nitrocellulose according to ISO 14 446, standard 27A and 30A in a ratio of 2:7.5) and of a copper phthalocyanine pigment preparation (dry) content, based on the total weight of the printing ink, of not more than 6.6% by weight, preferably not more than 6.5% by weight and in particular not more than 6.4% by weight, achieves the ⅓ standard color depth according to DIN 53235 of the corresponding hue.

By corresponding hue is meant the hue whose hue angle is closest to the hue angle of the pigment preparation of the invention.

The abovementioned pigment dispersion used for determining the viscosity, thixotropy and ⅓ standard color depth, consisting of copper phthalocyanine pigment preparation of the invention and ethanol/nitrocellulose gravure varnish, was brought to a state of adequate dispersion by dispersing for 45 minutes at a temperature of 20° C. to not more than 40° C. with the aid of a disperser with ellipsoidal shaking movements.

The printing ink for determining the ⅓ standard color depth is printed for example with the aid of a gravure sample printing machine and a corresponding printing plate with 70% coverage and an ink transfer of 11.8 ml/m² and a packaging paper coated on one side (80 g/m²).

A dynamic viscosity of 0.0 mPas is unachievable in practice, and so the minimum viscosity is usually greater than 0.1 mPas. The thixotropy values ought to be as small as possible, ideally equal to zero Pa/s.

The copper phthalocyanines in the pigment preparations of the invention are predominantly in the beta phase. They may have low chlorine contents, but these contents must not be too high, since otherwise the alpha phase is dominant.

The pigment dispersants used in accordance with the invention correspond preferably to the formula (I)

in which

T is a copper phthalocyanine radical which is substituted by 1 to 4 chlorine atoms or, preferably, is chlorine-free;

n is a number from 1 to 4;

$E^+$ is $H^+$ or the equivalent $M^{s+}$/s of a metal cation $M^{s+}$, preferably from main groups 1 to 5 or from transition groups 1 or 2 or 4 to 8 of the Periodic Table of the Elements, s being one of the numbers 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$.

Of particular interest are pigment dispersants of the formula (I) in which T is an unchlorinated copper phthalocyanine radical.

Of interest are pigment dispersants of the formula (I) with n being 1, 2 or 3, especially 1 or 2.

Also of particular interest are pigment dispersants of the formula (I), in which $E^+$ has the definition $H^+$; or where, in the case of the equivalent $M^{s+}$/s, the metal cation $M^{s+}$ has the definition $Na^+$, $K^+$, $Ca^{2+}$, $Mg^{2+}$, $Sr^{2+}$, $Ba^{2+}$, $Mn^{2+}$ or $Al^{3+}$, especially $H^+$ and $Na^+$.

The pigment dispersants are present appropriately in a total amount of 0.1% to 25% by weight, preferably 0.5% to 20% by weight, in particular 1% to 17.5% by weight, based on the weight of the copper phthalocyanine pigment.

The copper phthalocyanine pigment preparations of the invention can be prepared by finely dividing a crude copper phthalocyanine pigment by means of a method from the group of dry grinding and salt kneading to form a prepigment and then subjecting the prepigment to a finish treatment in a mixture of water and an organic solvent at alkaline pH, at elevated temperature and in the presence of at least one pigment dispersant from the group of copper phthalocyaninesulfonic acids and copper phthalocyaninesulfonic salts.

The copper phthalocyaninesulfonic salts can be prepared in situ: for example, by adding the copper phthalocyaninesulfonic acids and the substance containing the salt-forming counterion to a suspension of the prepigment. They can also be prepared separately: for example, by combining the parent copper phthalocyaninesulfonic acid with the substance containing the salt-forming counterion, in aqueous or organic solvent, with isolation where appropriate. They may also be formed during the actual preparation of the parent acidic pigment dispersants. The addition of the free acids of the pigment dispersants and of the substances containing the salt-forming counterions may also be made at different points in time in the process.

The pigment dispersants used in accordance with the invention can be used at any stage of the process with the proviso that the addition takes place before the finish. If they are not added until during the finish, they must be present for at least 5 minutes during the finish. They may therefore also be added to the actual synthesis of the crude copper phthalocyanine pigment or may be formed during the synthesis of the crude pigment, simultaneously. Their addition prior to grinding or to salt kneading is also conceivable. Preferably they are added immediately before the finish. After the finish the pH can be lowered again. By way of example the formation of salts may be favored at an acidic pH, of from 3 to 6 for example.

The crude copper phthalocyanine pigment directly after the synthesis generally includes up to about 35% by weight of salts formed during the synthesis. Commonly these salts originating from the synthesis are removed by means of an alkaline and/or acidic aqueous extraction. In the process of the invention it is possible to use both the crude pigment containing synthesis salt and the crude pigment purified of synthesis salt.

Dry grinding takes place with or without grinding assistants. Suitable grinding assistants include alkali metal salts or alkaline earth metal salts of inorganic acids, hydrochloric or sulfuric acid for example, or of organic acids having 1 to 4 carbon atoms, formic and acetic acid for example. Preferred salts are sodium formate, sodium acetate, calcium acetate, sodium chloride, potassium chloride, calcium chloride, sodium sulfate, aluminum sulfate or mixtures of these salts. The grinding assistants can be used in any desired amount: for example, in an amount of up to 5 times, based on the weight of the crude pigment. Larger amounts too can be used, but are uneconomic.

In the course of dry grinding it is possible to employ organic liquids in amounts of up to 15% by weight, for example, preferably up to 10% by weight, based on millbase, these amounts being such that the millbase still retains a free-flowing consistency. Examples of such liquids are alcohols having 1 to 10 carbon atoms, such as, for example, methanol, ethanol, n-propanol, isopropanol, butanols, such as n-butanol, isobutanol, tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, di-, tri- or tetraethylene glycol, propylene glycol, di-, tri- or tetrapropylene glycol, sorbitol or glycerol; polyglycols, such as polyethylene or polypropylene glycols; ethers, such as methyl isobutyl ether, tetrahydrofuran, dimethoxyethane or dioxane; glycol ethers, such as monoalkyl ethers of ethylene or propylene glycol or diethylene glycol monoalkyl ethers, in which alkyl may be methyl, ethyl, propyl and butyl, examples being butyl glycols or methoxybutanol; polyethylene glycol monomethyl ethers, particularly those having an average molar mass of 350 to 550 g/mol, and polyethylene glycol dimethyl ethers, especially those having an average molar mass of 250 to 500 g/mol; ketones, such as acetone, diethyl ketone, methyl isobutyl ketone, methyl ethyl ketone or cyclohexanone; a mono-, bis- or tris-hydroxy-$C_2$-$C_{12}$ alkane compound which contains 1 or 2 keto groups and in which one or more hydroxyl groups can be etherified with a $C_1$-$C_8$ alkyl radical or esterified with a $C_1$-$C_8$ alkylcarbonyl radical; aliphatic acid amides, such as formamide, dimethylformamide, N-methylacetamide or N,N-dimethyl-acetamide; urea derivatives, such as tetramethylurea; or cyclic carboxamides, such as N-methylpyrrolidone, valerolactam or caprolactam; esters, such as carboxylic acid $C_1$-$C_6$ alkyl esters, such as butyl formate, ethyl acetate or propyl propionate; or carboxylic acid $C_1$-$C_6$ glycol esters; or glycol ether acetates, such as 1-methoxy-2-propyl acetate; or phthalic acid dialkyl esters or benzoic acid alkyl esters, such as benzoic acid $C_1$-$C_4$ alkyl esters or $C_1$-$C_{12}$ alkyl diesters of phthalic acid; cyclic esters, such as caprolactone; nitriles, such as acetonitrile, aliphatic or aromatic amines, such as dimethylaniline or diethylaniline, for example; unhalogenated or halogenated aliphatic hydrocarbons or aromatic hydrocarbons such as benzine, pinene, carbon tetrachloride, tri- or tetrachloroethylene, tetrachloroethanes, benzene or alkyl-, alkoxy-, nitro-, cyano- or halogen-substituted benzene, examples being toluene, xylenes, ethylbenzene, anisole, nitrobenzene, chlorobenzene, dichlorobenzenes, trichlorobenzenes, benzonitrile or bromobenzene; or other substituted aromatics, such as phenols, aminophenols, cresols, nitrophenols, phenoxyethanol or 2-phenylethanol; aromatic heterocycles, such as pyridine, morpholine, picoline or quinoline; 1,3-dimethyl-2-imidazolidinone; sulfones and sulfoxides, such as dimethyl sulfoxide and sulfolane; and mixtures of these organic liquids. It is preferred to use those which have crystallizing and/or phase-determining properties. Preference is given to using glycols and glycol ethers, such as ethylene glycol, diethylene glycol or butyl glycol, amines, such as aniline, diethylaniline, dimethylaniline, n-butylamine, o-toluidine or tallow fatty propylene diamine, for example, diacetone alcohol, dimethylformamide, N-methylpyrrolidone, triethanolamine, toluene, xylene, cumene, mesitylene or octylbenzene.

In the course of dry grinding it is additionally possible to use acids as well in amounts of up to 15% by weight for example, preferably up to 10% by weight, based on millbase, these amounts being such that the millbase retains its free-flowing consistency. It is possible to use the acids known from the literature, examples being the acids recited in DE 28 51 752 or in EP 780 446. It is preferred to use phosphoric acid, formic acid, acetic acid, methanesulfonic acid, dodecylbenzenesulfonic acid and, in particular, sulfuric acid.

Dry grinding may take place conventionally on continuous or discontinuous roller or vibrator mills. Suitable grinding media include all those known in the literature, examples being balls, cylinders or rods and materials encompassing steel, porcelain, steatite, oxides, such as aluminum oxide or unstabilized or stabilized zirconium oxide, for example, mixed oxides, such as zirconium mixed oxide, for example, or glass, such as quartz glass, for example. Grinding may take place at temperatures up to 200° C., although commonly temperatures below 100° C. are employed. The residence time in the mill is guided by the desired requirement and by the quality of the crude pigment used and additionally depends to a considerable extent on the grinding equipment and on the shape and material of the grinding media employed. It can for example amount in the case of vibratory grinding to between 15 minutes and 25 hours, advantageously between 30 minutes and 15 hours, preferably between 30 minutes and 9 hours, and in the case of roller grinding to between 5 and 100 hours, advantageously between 8 and 50 hours, preferably between 10 and 30 hours.

If grinding assistants, organic liquids or acids have been used in the course of dry grinding they can be removed prior to the solvent treatment. This is particularly advisable when relatively large amounts of grinding assistants are used. To perform such removal the millbase is stirred with water to give an aqueous suspension and the additives are dissolved and separated from the prepigment by filtration. In the case of this treatment it has proven appropriate to set an acid pH by adding acid, hydrochloric or sulfuric acid for example. It is also possible to choose an alkaline pH in order, for example, to dissolve an acid that has been used. A further possibility is to dispense with the removal, particularly when small amounts of grinding assistants, organic liquids or acids are used. These components may also be dissolved by the water used for the finish, and/or neutralized by means of a corresponding amount of base.

Salt kneading may take place in a manner known from the literature. The crude pigment is kneaded with an organic liquid and with salt in the form of a kneadable paste of high viscosity. Salts and organic liquids used can be the same as those mentioned in connection with dry grinding. The temperature during kneading should be above the melting point and below the boiling point of the organic liquid.

For salt kneading as well it is possible to use the acids mentioned above. Suitable kneaders include the known continuous and batch kneaders, preference being given to double-arm batch kneaders. In the case of salt kneading it is usual to use relatively large amounts of salt and organic liquid, and hence it is usual to remove them prior to the finish, by means for example of an aqueous extraction at acid pH.

The preferred method of fine division is that of dry grinding.

The prepigment formed by the chosen method of fine division can be used in dry form or as a presscake for the finish, preference being given to its use in the form of a watery moist presscake.

The solvent system used for the finish is composed of water, organic solvent and an amount of base necessary to set an alkaline pH.

Suitable organic solvents include the following: alcohols having 1 to 10 carbon atoms, such as, for example, methanol, ethanol, n-propanol, isopropanol, butanols, such as n-butanol, isobutanol, tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, diethylene glycol, propylene glycol, dipropylene glycol, sorbitol or glycerol; polyglycols, such as polyethylene or polypropylene glycols; ethers, such as methyl isobutyl ether, tetrahydrofuran, dimethoxyethane or dioxane; glycol ethers, such as monoalkyl ethers of ethylene or propylene glycol or diethylene glycol monoalkyl ethers, in which alkyl may be methyl, ethyl, propyl and butyl, examples being butyl glycols or methoxybutanol; polyethylene glycol monomethyl ether, particularly that having an average molar mass of 350 to 550 g/mol, and polyethylene glycol dimethyl ether, especially that having an average molar mass of 250 to 500 g/mol; ketones, such as acetone, diethyl ketone, methyl isobutyl ketone, methyl ethyl ketone or cyclohexanone; a mono-, bis- or tris-hydroxy-$C_2$-$C_{12}$ alkane compound which contains 1 or 2 keto groups and in which one or more hydroxyl groups can be etherified with a $C_1$-$C_8$ alkyl radical or esterified with a $C_1$-$C_8$ alkylcarbonyl radical; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; nitriles, such as acetonitrile, aliphatic or aromatic amines, such as n-butylamine, for example; unhalogenated or halogenated aliphatic hydrocarbons or aromatic hydrocarbons such as cyclohexane, methylcyclohexane, methylene chloride, carbon tetrachloride, di-, tri- or tetrachloroethylene, di- or tetrachloroethanes or such as benzene or alkyl-, alkoxy-, nitro-, cyano- or halogen-substituted benzene, examples being toluene, xylenes, mesitylene, ethylbenzene, anisole, nitrobenzene, chlorobenzene, dichlorobenzenes, trichlorobenzenes, benzonitrile or bromobenzene; or other substituted aromatics, such as phenols, cresols, nitrophenols, such as o-nitrophenol, for example, phenoxyethanol or 2-phenylethanol; aromatic heterocycles, such as pyridine, morpholine, picoline or quinoline; 1,3-dimethyl-2-imidazolidinone; sulfones and sulfoxides, such as dimethyl sulfoxide and sulfolane; and mixtures of these organic solvents.

It is preferred to use solvents which have crystallizing and/or phase-determining properties.

Preferred solvents are $C_1$-$C_6$ alcohols, especially methanol, ethanol, n- and isopropanol, isobutanol, n- and tert-butanol and tert-amyl alcohol; $C_3$-$C_6$ ketones, especially acetone, methyl ethyl ketone or diethyl ketone; tetrahydrofuran, dioxane, ethylene glycol, diethylene glycol or ethylene glycol $C_3$-$C_5$ alkyl ethers, especially 2-methoxyethanol, 2-ethoxyethanol, butyl glycol, toluene, xylene, ethylbenzene, chlorobenzene, o-dichloro-benzene, nitrobenzene, cyclohexane, diacetone alcohol or methylcyclohexane.

In order to set an alkaline pH it is preferred as bases to use alkali metal and/or alkaline earth metal hydroxides, in the form where appropriate of their aqueous solutions, such as sodium or potassium hydroxide. Also conceivable are nitrogen-containing bases, such as ammonia or methylamine, for example.

In order to achieve the desired effect a pH of greater than or equal to 9.0 is advantageous, preferably a pH greater than or equal to 10, in particular a pH greater than or equal to 10.5. It is common to operate at a pH greater than or equal to 11.0. The base can also be used in large amounts of up to 20% by weight, preferably up to 15% by weight, in particular up to 10% by weight, based on the amount of water.

The weight ratio of water to organic solvent is 5:95 to 95:5, preferably 7.5: 92.5 to 92.5:7.5, in particular 10:90 to 90:10 and more preferably 20:80 to 80:20.

The total amount of water and organic solvent is in the range from 0.5 to 40, preferably from 1 to 20, in particular from 2 to 15, parts by weight per part by weight of pigment.

The solvent system may be a one-phase or two-phase system. It is preferred to use those organic solvents which are not completely miscible with water, and the finish is preferably carried out in a two-phase solvent system with an aqueous phase and an organic phase.

The finish in the method of the invention can be carried out at a temperature of 50 to 250° C., particularly 70 to 200° C., in particular 100 to 190° C., and advantageously for a time of 5 minutes to 24 hours, particularly 5 minutes to 18 hours, in particular 5 minutes to 12 hours. Preferably the finish is carried out at boiling temperature, in particular at temperatures above the boiling point of the solvent system under superatmospheric pressure.

In the case of organic solvents which can be separated from the aqueous phase by steam distillation it is appropriate to remove them in this way before the pigment preparation is isolated, particularly if recovery of the solvent used is desired.

The pigment preparations of the invention can be isolated using the standard methods, as for example by filtration, decanting or centrifugation. Solvents can also be removed by washing. The pigment preparations can be employed as preferably aqueous presscakes, but in general are dried, solid systems of free-flowing pulverulent consistency, or granules.

When preparing the pigment preparations it is possible to use auxiliaries, such as, for example, further surfactants, further pigmentary and nonpigmentary dispersants, fillers, standardizers, resins, waxes, defoamers, antistats, antidust agents, extenders, shading colorants, preservatives, drying retarders, rheology control additives, wetting agents, antioxidants, UV absorbers, light stabilizers, or a combination thereof. The auxiliaries can be added at any point in the process: for example, even before fine division, before the finish, or not until after the finish, or else by mixing in the dry state.

Suitable surfactants include anionic, or anion-active, cationic, or cation-active, and nonionic or amphoteric substances, or mixtures of these agents.

Examples of suitable anionic substances include fatty acid taurides, fatty acid N-methyltaurides, fatty acid isethionates, alkylphenylsulfonates, examples being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethylaminopropylamine and p-phenylenediamine. Preference is given to resin soaps, i.e., alkali metal salts of resin acids.

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkylamines, cycloalkylamines or cycles alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg of KOH per g of the polyaminoamido or polyamino compound, and salts of these cationic substances, such as acetates or chlorides, for example. Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

It is also possible to carry out the finish in an emulsion comprising water, surfactant and organic solvent.

By nonpigmentary dispersants are meant substances which structurally are not derived from organic pigments. They are added as dispersants either during the actual preparation of pigments, but often, also, during the incorporation of the pigments into the application media that are to be colored: for example, during the preparation of paints or printing inks, by dispersing of the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxy, amino, imino and ammonium groups, carboxylic acid and carboxylate groups, sulfonic acid and sulfonate groups or phosphonic acid and phosphonate groups, and may also have been modified with aromatic, nonpigmentary substances. Nonpigmentary dispersants may additionally also be aromatic substances modified chemically with functional groups and not derived from organic pigments. Nonpigmentary dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can also be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, dispersants with a comblike structure comprising polyesters and acrylic polymers, phosphoric esters, triazine-derived polymers, modified polyethers, or dispersants derived from aromatic, nonpigmentary substances. These parent structures are in many cases modified further, by means for example of chemical reaction with further substances carrying functional groups, or by means of salt formation.

By pigmentary dispersants are meant pigment dispersants which derive from an organic pigment parent structure and are prepared by chemically modifying said structure, examples being saccharine-containing pigment dispersants, piperidyl-containing pigment dispersants, naphthalene- or perylene-derived pigment dispersants, pigment dispersants having functional groups which are attached to the pigment structure via a methylene group, pigment structures chemically modified with polymers, pigment dispersants containing sulfo acid, sulfonamide or sulfo acid ester groups, pigment dispersants containing ether or thioether groups, or pigment dispersants containing carboxylic acid, carboxylic ester or carboxamide groups.

Further pigment dispersants are, in particular, those based on copper phthalocyanine of the formula (II)

(II)

in which
T is as defined above,
g is a number from 1 to 4, especially 1 or 2, and
$A^1$ is a group of the formula (IIa)

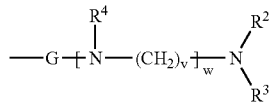
(IIa)

in which
G is a divalent —CO— or —$SO_2$— group,
$R^2$ and $R^3$ independently of one another are a hydrogen atom, a substituted or unsubstituted, or partly fluorinated or perfluorinated, branched or unbranched $C_1$-$C_{20}$ alkyl group, a substituted or unsubstituted $C_5$-$C_8$ cycloalkyl group or a substituted or unsubstituted, or partly fluorinated or perfluorinated $C_2$-$C_{20}$ alkenyl group, it being possible for the substituents to be hydroxyl, phenyl, cyano, chlorine, bromine, amino, $C_2$-$C_4$ acyl or $C_1$-$C_4$ alkoxy and to be preferably 1 to 4 in number, or in which
$NR^2R^3$ is a saturated, unsaturated or aromatic heterocyclic 5- to 7-membered ring which if desired contains 1 or 2 further nitrogen, oxygen or sulfur atoms or carbonyl groups in the ring, is unsubstituted or substituted by 1, 2 or 3 radicals, from the group OH, NH2, phenyl, CN, Cl, Br, $C_1$-$C_4$ alkyl, $C_1$-$C_4$-alkoxy, $C_2$-$C_4$ acyl and carbamoyl, and if desired carries 1 or 2 benzo-fused saturated, unsaturated or aromatic, carbocyclic or heterocyclic rings;
and $R^2$ and $R^3$ are preferably hydrogen or $C_1$-$C_4$ alkyl,
$R^4$ is hydrogen, $C_1$-$C_4$ alkyl, preferably hydrogen or methyl,
v is a number from 1 to 6, preferably 2 or 3,
w is a number 0 or 1, preferably 1;

or in which
T is as defined above,
g is a number from 1 to 6, preferably 1 to 4, and
$A^1$ is an aminomethylene group of the formula (IIb)

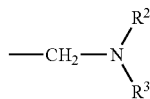
(IIb)

in which
$R^2$ and $R^3$ are as defined above, preferably hydrogen or $C_1$-$C_4$ alkyl, or in which
T is as defined above,
g is a number from 1 to 4, and
$A^1$ is a group of the formula (IIc)

(IIc)

in which
$A^2$ is a five- or six-membered aromatic ring or a fused aromatic heterocycle which contains 1 to 3 identical or different heteroatoms from the group nitrogen, oxygen and sulfur, and the heterocycle is attached via a carbon atom to the methylene group,
$R^{51}$ and $R^{52}$ are identical or different and are a hydrogen atom, a $C_1$-$C_4$ alkyl, a $C_1$-$C_4$ hydroxyalkyl or a $C_2$-$C_4$ alkylene group, preferably hydrogen, methyl, ethyl or hydroxyethyl, or an aryl group, aryl being phenyl which is unsubstituted or substituted by 1 to 4 radicals from the group $C_1$-$C_6$ alkyl, halogen, preferably F, Cl or Br, $C_1$-$C_6$ alkoxy, cyano, $CONH_2$ and $COOR^{54}$, where $R^{54}$ is hydrogen or $C_1$-$C_6$ alkyl,
$R^{51}$ and $R^{52}$ may together with $A^2$ also form an aliphatic or aromatic ring, preferably a phenyl ring,
$R^{53}$ is a hydrogen atom, a $C_1$-$C_4$ alkyl, a $C_1$-$C_4$ hydroxyalkyl or a $C_2$-$C_4$ alkenyl group;

or in which
T is as defined above,
g is a number from 1 to 4, and
$A^1$ is a group of the formula (IId)

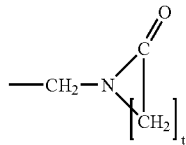
(IId)

in which
t is a number from 3 to 6, preferably 3, 4 or 5;

or in which
T is as defined above and if desired can be additionally substituted by 1, 2 or 3 sulfonic acid groups,
g is a number from 1 to 4, preferably 1, 2 or 3, and
$A^1$ is a phthalimidomethylene group of the formula (IIe)

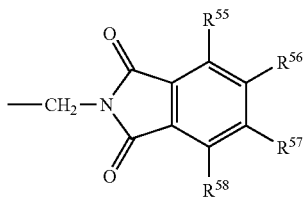
(IIe)

in which
R$^{55}$, R$^{57}$ and R$^{58}$ are identical or different and are hydrogen, fluorine, chlorine or bromine, preferably hydrogen,
R$^{56}$ is hydrogen, nitro, C$_1$-C$_5$ alkyl, C$_1$-C$_6$ alkoxy, benzoylamino, fluorine, chlorine or bromine, preferably hydrogen;

or in which
T is as defined above,
g is a number from 1 to 4, and
A$^1$ is an o-sulfobenzimidomethylene group of the formula (IIf)

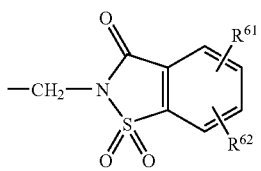
(IIf)

in which
R$^{61}$ and R$^{62}$ are identical or different and are hydrogen, chlorine, bromine, C$_1$-C$_4$ alkyl, C$_1$-C$_4$ alkoxy or nitro, preferably hydrogen;

or in which
T is as defined above,
g is a number from 1 to 4, and
A$^1$ is a group of the formula (IIg)

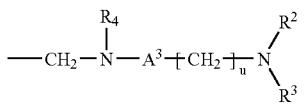
(IIg)

in which
A$^3$ is a carbonyl or sulfonyl group, preferably a carbonyl group,
R$^2$, R$^3$ and R$^4$ are as defined above,
u is the number 1 or 2, preferably 1;
or in which
T is as defined above,
g is a number from 1 to 4, and
A$^1$ is a group of the formula (IIh)

-G-OA$^{4+}$    (IIh)

in which
G is as defined above, and
A$^{4+}$ is a phosphonium ion; or is a substituted or unsubstituted ammonium ion.

A suitable substituted ammonium ion is for example an ion of the formula

N$^+$R$^9$R$^{10}$R$^{11}$R$^{12}$ where the substituents R$^9$, R$^{10}$, R$^{11}$ and R$^{12}$ are identical or different and are hydrogen, phenyl, (C$_1$-C$_4$)-alkylene-phenyl, C$_5$-C$_{30}$ cycloalkyl, C$_2$-C$_{30}$ alkenyl, or are branched or unbranched C$_1$-C$_{30}$ alkyl, it being possible for the phenyl ring, the (C$_1$-C$_4$)-alkylene-phenyl group, the C$_5$-C$_{30}$ cycloalkyl group, the C$_2$-C$_{30}$ alkenyl group and the C$_1$-C$_{30}$ alkyl group to be substituted by one or more, e.g., 1, 2, 3 or 4, substituents from the group Cl, Br, CN, NH$_2$, OH, C$_6$H$_5$, C$_6$H$_5$ substituted by 1, 2 or 3 C$_1$-C$_{20}$ alkoxy radicals, carbamoyl, carboxyl, C$_2$-C$_4$ acyl, C$_1$-C$_8$ alkyl, NR$^2$R$^3$, where R$^2$ and R$^3$ are as defined above, and C$_1$-C$_4$ alkoxy, e.g., methoxy or ethoxy, or for the alkyl group and the alkenyl group to be perfluorinated or partly fluorinated; or are a radical of the formula (Ib)

—[X—Y]$_h$—R$^3$    (Ib)

in which
h is a number from 0 to 100, preferably 0 to 20, more preferably 0, 1, 2, 3, 4 or 5;
X is a C$_2$-C$_6$ alkylene radical, C$_5$-C$_7$ a cycloalkylene radical, or a combination of these radicals, it being possible for these radicals to be substituted by 1 to 4 C$_1$-C$_4$ alkyl radicals, hydroxyl radicals, C$_1$-C$_4$ alkoxy radicals, (C$_1$-C$_4$)-hydroxyalkyl radicals and/or by 1 or 2 further C$_5$-C$_7$ cycloalkyl radicals, or in which X, if h is >1, can also be a combination of the stated definitions;
Y is an —O—,

or an —NR$^2$— group, or in which Y, if h is >1, can also be a combination of the stated definitions;
R$^3$ is as defined above; or where the substituents R$^9$ and R$^{10}$, together with the nitrogen atom of the ammonium ion, can form a five- to seven-membered saturated or unsaturated ring system which if desired contains further heteroatoms from the group O, S and N or carbonyl groups, and which if desired carries 1 or 2 fused-on saturated, unsaturated or aromatic, carbocyclic or heterocyclic rings; the ring system and the rings fused on where appropriate can be substituted by 1, 2 or 3 radicals from the group OH, NH$_2$, phenyl, CN, Cl, Br, C$_1$-C$_4$ alkyl, C$_1$-C$_4$ alkoxy, C$_2$-C$_4$ acyl and carbamoyl, of the pyrrolidone, imidazolidine, hexamethyleneimine, piperidine, piperazine or morpholine type, for example; or where the substituents R$^9$, R$^{10}$ and R$^{11}$ together with the nitrogen atom of the ammonium ion can form a five- to seven-membered aromatic ring system which if desired contains further heteroatoms from the group O, S and N or carbonyl groups and which if desired carries 1 or 2 fused-on saturated, unsaturated or aromatic, carbocyclic or heterocyclic rings, it being possible for the ring system and the rings fused on where appropriate to be substituted by 1, 2 or 3 radicals from the group OH, NH$_2$, phenyl, CN, Cl, Br, C$_1$-C$_4$ alkyl, C$_1$-C$_4$ alkoxy, C$_2$-C$_4$ acyl and carbamoyl, of the pyrrole, imidazole, pyridine, picoline, pyrazine, quinoline or isoquinoline type, for example.

Also suitable as substituted ammonium is the 1/p equivalent of an ammonium ion of the formula (Ic)

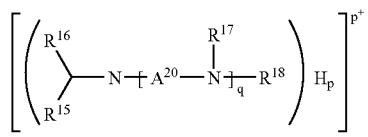

in which
R$^{15}$, R$^{16}$, R$^{17}$ and R$^{18}$ independently of one another are hydrogen or a (poly)alkyleneoxy group of the formula (Id);

in which j is the number 2 or 3, k is a number from 1 to 100, the radicals R$^{80}$ can be hydrogen, C$_1$-C$_4$ alkyl or, if k is >1, a combination thereof, and the radical R$^{81}$ is hydrogen, C$_1$-C$_4$ alkyl or the group —(CH(R$^{82}$)—)$_i$NH$_2$, i is the number 2 or 3 and the radicals R$^{82}$ are hydrogen, C$_1$-C$_4$ alkyl or a combination thereof;
q is a number from 1 to 10, preferably 1, 2, 3, 4 or 5;
p is a number from 1 to 5, p being ≦q+1;
A$^{20}$ is a branched or unbranched C$_2$-C$_6$ alkylene radical; or in which A$^{20}$, if q is >1, can also be a combination of branched or unbranched C$_2$-C$_6$ alkylene radicals.

A further suitable substituted ammonium ion is an ammonium ion which derives from a polyaminoamido compound or polyamino compound and has a fraction of reactive polyamino groups such that the amine index is between 100 and 800 mg KOH per g of the polyaminoamido or polyamino compound, as disclosed for example in DE-A-27 39 775.

A further suitable substituted ammonium ion is a cation of a polymeric ammonium salt having an average molecular weight of 500 to 2 500 000 which is soluble in water or in C$_1$-C$_4$ alcohol, as disclosed for example in DE-A-42 14 868.

A further suitable substituted ammonium ion is the 1/r equivalent of a diamine-derived ammonium ion of the formula (III)

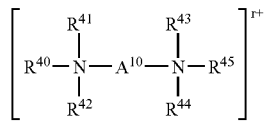

as disclosed for example in WO 01/14479
and in which
R$^{40}$ is C$_6$-C$_{30}$ alkyl, preferably linear C$_8$-C$_{20}$ alkyl, or C$_6$-C$_{30}$ alkenyl, preferably linear,
R$^{41}$ is a free valence, hydrogen, C$_1$-C$_{30}$ alkyl, C$_2$-C$_{30}$ alkenyl, C$_3$-C$_{30}$ cycloalkyl, C$_6$-C$_{14}$ aryl or C$_7$-C$_{38}$ aralkyl,
R$^{42}$R$^{43}$ and R$^{45}$ are identical or different and are C$_1$-C$_6$alkyl, preferably methyl, C$_3$-C$_{30}$ cycloalkyl, C$_6$-C$_{14}$ aryl or C$_7$-C$_{38}$ aralkyl,
R$^{44}$ is a free valence, hydrogen, C$_1$-C$_6$ alkyl, preferably methyl, C$_3$-C$_{30}$ cycloalkyl, C$_6$-C$_{14}$ aryl or C$_7$-C$_{38}$ aralkyl, with the proviso that R$^{41}$ and R$^{44}$ are not simultaneously a free valence,
r is the number 2 or, where R$^{41}$ or R$^{44}$ is a free valence, is the number 1,
A$^{10}$ is C$_1$-C$_{12}$ alkylene or C$_2$-C$_{14}$ alkenylene, and contains preferably 2, 3 or 4 carbon atoms, in particular 3; or
R$^{41}$ and R$^{43}$, together with the two nitrogen atoms to which they are attached and with A$^{10}$, form a ring, preferably piperazinyl; and/or
R$^{44}$ and R$^{45}$, together with the nitrogen atom to which they are attached, form a ring, preferably piperidinyl, morpholinyl, piperazinyl or N-(C$_1$-C$_6$ alkyl)piperazinyl.

The radicals identified in the definition of R$^{40}$ to R$^{45}$ are preferably unsubstituted or are substituted by substituents from the group OH, C$_1$-C$_6$ alkyl, preferably methyl, C$_1$-C$_6$ alkoxy, CN and halogen, especially chlorine or bromine.

Aryl is preferably phenyl, aralkyl is preferably benzyl or 2-phenylethyl, and cycloalkyl is preferably cyclopentyl or cyclohexyl.

Preferred ions of the formula (III) are those in which R$^{41}$ and R$^{44}$ is hydrogen and R$^{42}$, R$^{43}$ and R$^{45}$ are methyl, more preferably those ions of the formula (III) in which R$^{41}$ to R$^{45}$ are methyl. Preference is further given to those ions of the formula (III) which derive from amines of natural oils and fats, such as coconut oil, corn oil, cereal oil, train oil or sperm oil, particularly from tallow fat.

Preferably A$^{4+}$ is a protonated tertiary amine which has been obtained from oils and fats such as tallow, coconut oil, corn oil, cereal oil, train oil or sperm oil and is, for example, triisooctylamine, dimethyltallowamine, dimethylsoyaamine, dimethyloctadecylamine or hydrogenated monomethyl-di (tallowamine) or an alkoxylated derivative of a fatty amine, examples being tallowalkyldi(2-hydroxyethyl)amine, polyoxyethylene(5)tallowamine, polyoxyethylene(8)oleylamine, N,N',N'-tris(2-hydroxyethyl)-N-tallow-1,3-di-aminopropane, N,N',N'-polyoxyethylene(12)-N-tallow-1,3-diaminopropane; or A$^{4+}$ is preferably a quaternary ammonium ion which is preferably derived from the amines or alkoxylated fatty amines obtained from oils and fats above, by way of example by methylation or by reaction with benzyl chloride, and, for example, stearylbenzyl- or cocoalkyl-dimethylbenzylammonium or -2,4-dichlorobenzylammonium, hexadecyl-, stearyl-, dodecyl- or cetyltrimethylammonium, dihydrogenated tallowalkyl-, dicocoalkyl- or distearyldimethylammonium, oleyl- or cocodi(2-hydroxyethyl)methylammonium, hydrogenated polyoxyethylene (15)-tallowmethylammonium, N,N,N',N',N'-pentamethyl-N-tallow-1,3-propanediammonium, permethylated N-stearyidiethylenetriamine, permethylated N-stearyltriethylenetetramine, N-(3-dodecyloxy-2-hydroxypropyl)octadecyldimethylammonium, methyltri(2-octyl)ammonium, N,N-di(beta-stearoylethyl)-N,N-dimethylammonium, laurylpyridinium, 2-hydroxy-[5-chloro-, 5-isooctyl-, 5-t-butyl- or n-nonyl-]-1,3-xylylene-bispyridinium, 2-methoxy-5-isooctyl-1,3-xylylene-bispyridinium, 2-hydroxy-5-isooctyl-1,3-xylylene-bisquinolinium, 2-hydroxy-5-isooctyl-1,3-xylylene-bisisoquinolinium or behenyltrimethylammonium; or A$^{4+}$ is preferably a phosphonium ion such as hexadecyltributylphosphonium, ethyltrioctylphosphonium or tetrabutylphosphonium; it being possible for the original anions of the quaternary ammonium compounds or phosphonium compounds used to have been, for example, halide, sulfate, alkoxysulfate, alkoxyphosphate.

Further of particular interest are pigment dispersants of the formula (IIh) in which the amine on which the ammonium ion N$^+$R$^9$R$^{10}$R$^{11}$R$^{12}$ is based is a primary or secondary amine, especially mixtures of primary and secondary amines with unmixed or mixed hydrocarbon radicals of naturally occurring oils and fats such as tallow, coconut oil, corn oil, cereal oil, train oil or sperm oil, or wood resin; examples of specific compounds include ammonia, methylamine, triethylamine, butylamines, dibutylamines, tributylamine, hexylamines, dodecylamine, stearylamine, diethylamine, di-n-butylamine, ethylenediamine, aniline, N-methylaniline, benzylamine, phenylethylamine, cyclohexylaminoethylamine, 2-cyclohexylaminopropyl-amine, 3-stearylaminopropylamine, 2-dimethylaminoethylamine, 2-diethyl-aminoethylamine, 2-dipropylaminoethylamine, 2-dibutylaminoethylamine, 3-dimethylaminopropylamine, 3-diethylaminopropylamine, 3-cyclohexyl-aminopropylamine, N-methylpiperazine, N-aminopropylmorpholine, N-aminoethylpiperidine, N-aminoethylpyrrolidine, N-aminopropylpipecoline, 4-diethylamino-1-methylbut-1-ylamine, laurylamine, cocoamine or tallowamine, lauryl-, oleyl- or tallowpropylenediamine, tallow-dipropylenetriamine, tallowtripropylenetetraamine, 1,1,3,3-tetra-methyl-butylamine, primary amines having tertiary $C_{16}$-$C_{22}$ alkyl groups, N,N-bisaminopropyltallowamine, 2-ethylhexoxypropylamine or dehydro-abietylamine.

Particular preference is given to pigment dispersants of the formula (II) in which $A^1$ is a phthalimidomethylene group of the formula (IIe), an imidazolylmethylene group of the formula (IIc), an aminomethylene, an N-methylaminomethylene, an N,N-dimethylaminomethylene, an N-ethyl-aminomethylene or an N,N-diethylaminomethylene group of the formula (IIb) or an ammonium sulfonate group of the formula (IIh).

Anionic groups of the nonpigmentary and pigmentary dispersants, surfactants or resins used as auxiliaries may also be laked, using for example Ca, Mg, Ba, Sr, Mn or Al ions or using quaternary ammonium ions. This may be done before or after the finish.

By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the grinding of the crude pigment or before the pulverization of the dried pigment preparation.

It has also proven appropriate to add small amounts of additives from the group consisting of phthalimide, phthalic anhydride, hydrogenated wood resin and glyceryl monooleate during grinding.

After the finish the suspension may further be subjected to a mechanical or thermal treatment, such as to dispersing by means of a bead mill or, preferably following removal of the solvent by steam distillation, to the addition of further auxiliaries or the aforementioned laking of anionic groups at elevated temperature.

The pigment preparations of the invention can be employed for pigmenting high molecular weight organic materials of natural or synthetic origin, such as of plastics, resins, varnishes, paints, electrophotographic toners and developers, electret materials, color filters, and also of inks, including printing inks, and seed for example.

High molecular weight organic materials which can be pigmented with the pigment preparations of the invention are, for example, cellulose compounds, such as cellulose ethers and cellulose esters, such as ethylcellulose, nitrocellulose, cellulose acetates or cellulose butyrates, natural binders, such as fatty acids, fatty oils, resins and their conversion products, or synthetic resins, such as polycondensates, polyadducts, addition polymers and copolymers, examples being amino resins, especially urea- and melamine-formaldehyde resins, alkyd resins, acrylic resins, phenolic resins, such as novolaks or resoles, urea resins, polyvinyls, such as polyvinyl alcohols, polyvinylacetals, polyvinyl acetates or polyvinyl ethers, polycarbonates, polyolefins, such as polystyrene, polyvinyl chloride, polyethylene or polypropylene, poly(meth)acrylates and copolymers thereof, such as polyacrylic esters or polyacrylonitriles, polyamides, polyesters, polyurethanes, coumarone-indene resins and hydrocarbon resins, epoxy resins, unsaturated synthetic resins (polyesters, acrylates) with the different curing mechanisms, waxes, aldehyde resins and ketone resins, rubber, latex and its derivatives and lattices, casein, silicones and silicone resins, for example; individually or in mixtures.

It is unimportant whether the aforementioned high molecular weight organic compounds are in the form of plastic masses, melts, or in the form of spinning solutions, dispersions, varnishes, paints or printing inks. Depending on the intended use it proves advantageous to utilize the pigment preparations of the invention in the form of a blend or in the form of prepared products or dispersions. Based on the high molecular weight organic material that is to be pigmented, the pigment preparations of the invention are used in an amount of 0.05% to 30% by weight, preferably 0.1% to 15% by weight.

The pigment preparations of the invention are also suitable for use as colorants in electrophotographic toners and developers, such as, for example, one- or two-component powder toners (also called one- or two-component developers), magnetic toners, liquid toners, polymerization toners and specialty toners.

Typical toner binders are addition-polymerization resins, polyaddition resins and polycondensation resins, such as styrene, styrene-acrylate, styrene-butadiene, acrylate, polyester and phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment preparations of the invention are additionally suitable for use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

As powder coating resins use is made typically of epoxy resins, carboxyl- and hydroxyl-containing polyester resins, polyurethane resins and acrylic resins, together with customary hardeners. Combinations of resins are also employed. For example, epoxy resins are frequently used in combination with carboxyl- and hydroxyl-containing polyester resins. Typical hardener components (depending on the resin system) are, for example, acid anhydrides, imidazoles, and also dicyandiamide and the derivatives thereof, masked isocyanates, bisacylurethanes, phenolic resins and melamine resins, triglycidyl isocyanurates, oxazolines and dicarboxylic acids.

The invention further provides for the use of the pigment preparations of the invention as colorants for printing inks, especially for ink-jet inks. By ink-jet inks are meant inks on an aqueous basis (including micro-emulsion inks) and a nonaqueous (solvent-based) basis, UV-curable inks, and those inks which operate in accordance with the hot-melt process.

Solvent-based ink-jet inks contain essentially 0.5% to 30% by weight, preferably 1% to 15% by weight, of one or more of the pigment preparations of the invention, 70% to 95% by weight of an organic solvent or solvent mixture and/or a hydrotropic compound. If desired the solvent-based ink-jet inks may include carrier materials and binders which are soluble in the "solvent", such as, for example, polyolefins, natural and synthetic rubber, polyvinyl chloride, vinyl chloride/vinyl acetate copolymers, polyvinylbutyrals, wax/latex systems or combinations of these compounds. If desired the solvent-based ink-jet inks may further comprise binders and further additives, such as wetting agents, devolatalizers/defoamers, preservatives and antioxidants, for example.

Microemulsion inks are based on organic solvents, water and, if desired, an additional substance which acts as an interface mediator (surfactant). Microemulsions contain 0.5% to 30% by weight, preferably 1% to 15% by weight, of one or more of the pigment preparations of the invention, 0.5% to 95% by weight of water, and 0.5% to 95% by weight of organic solvents and/or interface mediators.

UV-curable inks contain essentially 0.5% to 30% by weight of one or more of the pigment preparations of the invention, 0.5% to 95% by weight of water, 0.5% to 95% by weight of an organic solvent or solvent mixture, 0.5% to 50% by weight of a radiation-curable binder and, if desired, 0% to 10% by weight of a photoinitiator.

Hot-melt inks are based mostly on waxes, fatty acids, fatty alcohols or sulfonamides which are solid at room temperature and liquefy on heating, the preferred melting range being between about 60° C. and about 140° C. Hot-melt ink-jet inks consist, essentially of 20% to 90% by weight of wax and 1% to 10% by weight of one or more of the pigment preparations of the invention. Additionally present may be 0% to 20% by weight of an additional polymer (as "dye dissolver"), 0% to 5% by weight of dispersant, 0% to 20% by weight of viscosity modifier, 0% to 20% by weight of plasticizer, 0% to 10% by weight of tack additive, 0% to 10% by weight of transparency stabilizer (which prevents, for example, crystallization of the wax), and 0% to 2% by weight of antioxidant.

The printing inks of the invention, especially ink-jet inks, can be prepared by dispersing the pigment preparations of the invention into the micro-emulsion medium, into the nonaqueous medium or into the medium for preparing the UV-curable ink or into the wax for preparing a hot-melt ink-jet ink. Appropriately the printing inks obtained for ink-jet applications are subsequently filtered (through a 1 μm filter, for example).

Additionally the pigment preparations of the invention are also suitable as colorants for color filters, both for additive and for subtractive color generation, and also as colorants for electronic inks (or e-inks) or electronic paper (e-paper).

In connection with the production of what are called color filters, both reflecting and transparent color filters, pigments are applied in the form of a paste or as pigmented photoresists in suitable binders (acrylates, acrylic esters, polyimides, polyvinyl alcohols, epoxides, polyesters, melamines, gelatins, caseins) to the respective LCD components (e.g., TFT-LCD=thin film transistor liquid crystal displays or, e.g., ((S) TN-LCD=(super) twisted nematic-LCD). Besides a high thermal stability, a further prerequisite for a stable paste or for a pigmented photoresist is a high pigment purity. Additionally the pigmented color filters can also be applied by ink jet printing processes or other suitable printing processes.

The pigment preparations of the invention are notable for their outstanding coloristic and rheological properties, in particular their flocculation stability, dispersibility, rheology, gloss, transparency, and color strength. They can be dispersed easily and to high levels of fineness in many application media. Such pigment dispersions display outstanding rheological properties, even at high levels of pigmentation of the paint and printing ink concentrates. They can be used to give coatings and, in particular, prints possessing high color strength, high gloss and high transparency and having excellent fastness properties.

In order to assess the properties of the pigments in the coatings sector, in water-free, solvent-based coating systems, a selection was made, from among the multiplicity of known coating materials, of an alkyd-melamine resin varnish based on a medium-oil alkyd resin and a butanol-etherified melamine resin (AM).

In order to assess the properties of the pigments in the coatings sector in aqueous coating systems, a selection was made, from among the multiplicity of known coating systems, of an aqueous varnish based on polyurethane (PU).

In order to assess the properties of the pigments in the printing inks field a selection was made, from among the multiplicity of known printing systems, of a nitrocellulose-alcohol gravure system having a high pigment concentration of 28% by weight pigment, based on millbase, during dispersing to give the printing ink concentrate (NC-A-HC).

The coloristic properties were determined in accordance with DIN 55986. The color depth determination is made in comparison to the ⅓ standard color depth in accordance with DIN 53235.

The millbase rheology of a varnish after dispersion was evaluated visually on the basis of the following five-point scale.
5 highly fluid
4 liquid
3 viscous
2 slightly set
1 set The overcoating fastness was determined in accordance with DIN 53221. The viscosity of a varnish was determined, following dilution of the millbase to the final pigment concentration, using the Rossmann viscospatula type 301 from Erichsen.

In the examples and test protocols below, percentages and parts are by weight, unless otherwise indicated.

Test protocols for testing the dynamic viscosity and the thixotropy in the millbase (printing ink concentrate, 28% by weight) and for determining the ⅓ standard color depth:

a) Preparation of the 28% Printing Ink Concentrates

A 250 ml PE plastic beaker Ø 55 mm×125 mm with push-on lid is filled with 150 g of zirconium mixed oxide beads (69% $ZrO_2$, $_{31}$% amorphous $SiO_2$) 1.0 to 1.25 mm in diameter, and 28.00 g of pigment preparation, 36.00 g of gravure varnish (1), consisting of 25.0% of nitrocellulose A500 (in accordance with ISO 14 446, standard 27A) and 75.0% of anhydrous ethanol, and 36.00 g of solvent mixture, consisting of 98.0% of 99.9% ethanol and 2.0% of 99.9% ethyl acetate, are weighed in. The mixer is dispersed using the DAS 200 K disperser from LAU GmbH, Hemer, by means of ellipsoidal shaking movements at 660 rpm for 45 minutes (ventilation stage 1, i.e., the temperature during dispersing does not rise above 40° C.). Using a sieve, the zirconium mixed oxide beads are screened off.

b) Determining Viscosity and Thixotropy of the 28% Printing Ink Concentrates

The dispersion concentrates are stored at RT (21° C.-25° C.) for 24 hours and conditioned at 23° C. for 30 minutes prior to measurement. Viscosity and thixotropy of the dispersion concentrates are measured using a Haake RS75 or RS1 rotational viscometer from Haake, Karlsruhe. The measuring geometry is a coaxial cylinder system in accordance with DIN 53019/ISO3219. Throughout the measurement the sample in the instrument is conditioned at $(23\pm0.1)°$ C. A linear shear-rate ramp is followed, from 0 to 250 sec$^{-1}$ in 180 sec, with at least 50 linearly graduated measurements, and immediately thereafter a linear ramp back from 250 to 0 sec$^{-1}$ in 180 sec, with a further at least 50 linearly graduated measurements. The viscosity value is determined in the ascending branch at 200 sec$^{-1}$ by interpolation of the measurement points. The thixotropy value is determined as the difference in the areas beneath the curves for shear stress in Pa against shear rate in sec in the ascending branch and in the descending branch of the ramp, and is expressed in Pa/sec.

c) Determining the Pigment Concentration Required to Reach ⅓ Standard Color Depth, Starting From 28% Printing Ink Concentrates The 28% printing ink concentrate (see section a) is extended to a pigment concentration of 10% using a mixture consisting of one part of ethanol (anhydrous) and one part of a gravure varnish (2) (consisting of 30.0% of nitrocellulose A 400 (65% ethanol-moist) in accordance with ISO 14 446, standard 30A, 4.0% of Genomoll 140 (dibutyl phthalate), 8.0% of 1-methoxy-2-propanol and 58.0% of anhydrous ethanol). This printing ink is used to produce a print, by means of a printing plate having an engraved depth of 29 μm, and the color strength is determined in comparison to the ⅓ standard color depth. Then the amount of gravure varnish (3) added to the printing ink concentrate (and consisting of one part of ethanol (anhydrous) and one part of gravure varnish (2) is increased until ⅓ standard color depth is reached. The starting point in each case is from the 28% printing ink concentrate again.

The pigment concentration is calculated from the amounts used.

Printing machine: Gravure sample printing machine, "Labratester" model, N. Schläfli, CH4800 Zofingen Print substrate: Algro Finesse 80 g/m²
Printing rate: 125 scale divisions
Printing plate: Plate with engraved depth of 29 μm.
Details of the 29 μm field of the engraved plate:
X-diagonal: 178 μm
y-diagonal: 126 μm
Depth: 29 μm
Halftone: 70% coverage
Angle: 30°
Volume area: 11.8 ml/m²

EXAMPLE 1

A) Grinding and Acidic Suspension 550 parts of crude P. Blue 15 pigment, 550 parts of sodium sulfate and 120 parts of diethylene glycol are ground in a vibratory mill with iron rods for 90 minutes. The millbase is stirred in 4000 parts of 5% strength aqueous sulfuric acid at 90° C. for 2 h. The suspension is filtered and washed salt-free with water. This gives 740.6 parts of 60.4% presscake of the prepigment.

B) Finish 165.6 parts of 60.4% presscake from A) are suspended in 620 parts of tert-amyl alcohol and 350.2 parts of water. 4.2 parts of sodium hydroxide and 15.4 parts of aqueous, 32.4% presscake of a copper phthalocyanine-sulfonic acid having an average degree of substitution of 1.5 sulfonic acid groups per copper phthalocyanine radical are added and the suspension is heated to 150° C. It is stirred at 150° C. for 2 hours and then the amyl alcohol is distilled off, the suspension is filtered and the presscake is washed salt-free. This gives 239 parts of 40.4% presscake of the phthalocyanine pigment preparation.

C) Drying 59 parts of a presscake from B) are dried at 80° C. This gives 23.8 parts of phthalocyanine pigment preparation.

In the AM varnish system, strongly colored, transparent greenish blue coatings are obtained, the millbase rheology of the varnish is evaluated as being 5, the gloss measurement returns a value of 77, and the viscosity of the varnish is 4.0 sec.

In the PU varnish system the coatings are likewise strongly colored, transparent and greenish blue, the overcoating fastness is very good, and the rheology is evaluated as being 3.

In the NC-A-HC printing system, strongly colored, transparent greenish blue prints are obtained with a high gloss, and the viscosity of the printing ink concentrate after dispersion is very low.

D) Aftertreatment 79.7 parts of a presscake from B) are pasted in 250 parts of water and heated to 80° C. 7.7 parts of aqueous 32.4% presscake of a copper phthalocyaninesulfonic acid having an average degree of substitution of 1.5 sulfonic acid groups per copper phthalocyanine radical are added and the suspension is stirred at 80° C. for 1 hour. The suspension is filtered and the presscake is washed and dried. This gives 32.6 parts of phthalocyanine pigment preparation.

In the AM varnish system, strongly colored, transparent greenish blue coatings are obtained, the millbase rheology of the varnish is evaluated as being 5, the gloss measurement returns a value of 55, and the viscosity of the varnish is 3.3 sec.

In the NC-A-HC printing system, strongly colored, transparent greenish blue prints of high gloss are obtained, and the viscosity of the printing ink concentrate after dispersion is very low.

Results

The table shows the results for three standard commercial products and for examples 1C and 1 D:

| Pigment | Pigment concentration at ⅓ standard color depth | Dyn. viscosity at shear rate of 200 s$^{-1}$ [mPas] | Thixotropy [Pa/s] |
| --- | --- | --- | --- |
| Example 1C | 6.2% by weight | 128 | 345 |
| Example 1D | 6.4% by weight | 80 | 17 |
| Commercial product 1 | 6.2% by weight | 229 | 1511 |
| Irgalite Blue GLVO | 6.0% by weight | 263 | 2011 |

Commercial product 1 was prepared by the method of JP 57-12067 example 5.

®Irgalite Blue GLVO is a product of Ciba Spezialitäten Chemie AG and is a pigment preparation comprising a copper phthalocyanine and a substituted copper phthalocyanine, substituted by the aminomethylene group of the formula (IIb), as pigment dispersant.

What is claimed is:

1. A copper phthalocyanine pigment preparation comprising a copper phthalocyanine pigment and at least one pigment dispersant, wherein the at least one pigment dispersant is a compound of the formula (I)

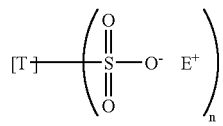

wherein
T is a copper phthalocyanine radical substituted by 1 to 4 chlorine atoms or is chlorine-free;
n is a number from 1 to 4; and
$E^+$ is $H^+$ or the equivalent $M^{s+}/s$ of a metal cation $M^{s+}$, s being one of the numbers 1, 2 or 3, and wherein the copper phthalocyanine pigment preparation exhibits
a) at least one of a dynamic viscosity of not more than 180 mPas or a thixotropy of not more than 800 Pa/s, the dynamic viscosity and the thixotropy being determined with a rotational viscometer at a temperature of 23° C. in a pigment dispersion consisting of 28% by weight of dry copper phthalocyanine pigment preparation, 9% by weight of nitrocellulose, according to ISO 14 446, standard 27A, 62.3% by weight of ethanol and 0.7% by weight of ethyl acetate, and wherein the phthalocyanine pigment preparation exhibits
b) a color strength that achieves 1/3 standard color strength if a printing ink consists of an ethanol/nitrocellulose gravure varnish containing 75% to 85% by weight of ethanol and 9% to 11% by weight of nitrocellulose in a ratio of 2:7.5 and a dry copper phthalocyanine pigment preparation content, based on the total weight of the printing ink, of not more than 6.6% by weight.

2. The copper phthalocyanine pigment preparation as claimed in claim 1, having at least one of a dynamic viscosity of not more than 150 mPas and a thixotropy of not more than 600 Pa/s.

3. The copper phthalocyanine pigment preparation as claimed in claim 1 that achieves 1/3 a color strength if a printing ink consists of an ethanol/nitrocellulose gravure varnish containing 75% to 85% by weight of ethanol and 9% to 11% by weight of nitrocellulose in a ratio of 2:7.5 and a dry copper phthalocyanine pigment preparation content, based on the total weight of the printing ink, of not more than 6.5% by weight.

4. The copper phthalocyanine pigment preparation as claimed in claim 1, having
a) at least one of a dynamic viscosity of not more than 150 mPas, and a thixotropy of not more than 450 Pa/s, and having b) a color strength that achieves a 1/3 standard color strength if a printing ink consists of an ethanol/nitrocellulose gravure varnish containing 75% to 85% by weight of ethanol and 9% to 11% by weight of nitrocellulose in a ratio of 2:7.5 and a dry copper phthalocyanine pigment preparation content, based on the total weight of the printing ink, of not more than 6.4% by weight.

5. The copper phthalocyanine pigment preparation as claimed in claim 1, wherein the copper phthalocyanine pigment contains 0% to 6% by weight of chlorine.

6. The copper phthalocyanine pigment preparation as claimed in claim 1, containing 0.1% to 25% by weight, based on the weight of the copper phthalocyanine pigment, of the at least one pigment dispersant.

7. The copper phthalocyanine pigment preparation as claimed in claim 1, wherein the copper phthalocyanine radical is chlorine free.

8. The copper phthalocyanine pigment preparation as claimed in claim 1, containing 0.5% to 20% by weight, based on the weight of the copper phthalocyanine pigment, of the at least one pigment dispersant.

9. A process for preparing a copper phthalocyanine pigment preparation as claimed in claim 1, comprising the steps of finely dividing a crude copper phthalocyanine pigment by dry grinding or salt kneading to form a prepigment and subjecting the prepigment to a finish treatment in a mixture of water and an organic solvent at alkaline pH, at a temperature from 50 to 250° C. and adding the least one pigment dispersant.

10. A pigmented high molecular weight organic material comprising a copper phthalocyanine pigment preparation as claimed in claim 1, wherein the high molecular weight material is selected from the group consisting of plastics, resins, varnishes, paints, electrophotoaraphic toners, electrophotographic developers, electret materials, color filters, inks, and seed.

11. The pigmented high molecular weight organic material as claim in claim 10, wherein the ink is a printing ink.

12. A high molecular weight organic material containing 0.05% to 30% by weight of a copper phthalocyanine pigment preparation as claimed in claim 1, wherein the high molecular weight material is selected from the group consisting of plastics, resins, varnishes, paints, electrophotographic toners. electrophotographic developers, electret materials, color filters, inks, and seed.

13. The pigmented high molecular weight organic material as claim in claim 12, wherein the ink is a printing ink.

* * * * *